United States Patent
Ng et al.

(10) Patent No.: US 11,099,798 B2
(45) Date of Patent: Aug. 24, 2021

(54) DIFFERENTIATED CONTENT DELIVERY SYSTEM AND METHOD THEREFOR

(71) Applicant: Misapplied Sciences, Inc., Redmond, WA (US)

(72) Inventors: Albert Han Ng, Redmond, WA (US); Paul Henry Dietz, Redmond, WA (US); David Steven Thompson, Redmond, WA (US)

(73) Assignee: Misapplied Sciences, Inc., Redmond, WA (US)

( * ) Notice: Subject to any disclaimer, the term of this patent is extended or adjusted under 35 U.S.C. 154(b) by 329 days.

(21) Appl. No.: 15/002,158

(22) Filed: Jan. 20, 2016

(65) Prior Publication Data

US 2016/0210100 A1    Jul. 21, 2016

Related U.S. Application Data

(60) Provisional application No. 62/105,706, filed on Jan. 20, 2015.

(51) Int. Cl.
   *G06F 3/14*           (2006.01)
   *G06K 9/00*          (2006.01)
   *G06F 3/03*           (2006.01)

(52) U.S. Cl.
   CPC .............. *G06F 3/1423* (2013.01); *G06F 3/03* (2013.01); *G06K 9/00362* (2013.01)

(58) Field of Classification Search
CPC ............ H04N 13/0468; H04N 13/047; H04N 13/00–13/398; H04N 21/44218; G06F 3/012; G06F 3/013; G06F 3/03; G06F 11/00–3698; G06F 21/00–88; G06F 2201/00–885; G06F 2221/2117; G06K 9/00221–00389; G06N 5/00–048; G06N 7/00–08; G06N 20/00–20; G09G 3/003; G09G 2354/00
USPC ......................................................... 345/156
See application file for complete search history.

(56) References Cited

U.S. PATENT DOCUMENTS

| | | | |
|---|---|---|---|
| 5,855,425 | A | 1/1999 | Hamagishi |
| 6,339,421 | B1 | 1/2002 | Puckeridge |
| 6,377,295 | B1 | 4/2002 | Woodgate et al. |
| 7,001,023 | B2 | 2/2006 | Lee et al. |
| 7,602,395 | B1 | 10/2009 | Diard |

(Continued)

FOREIGN PATENT DOCUMENTS

| | | |
|---|---|---|
| EP | 2685735 A1 | 1/2014 |
| WO | 0224470 A | 3/2002 |
| WO | 2013183108 A1 | 12/2013 |

OTHER PUBLICATIONS

"Non-Final Office Action" dated Jan. 31, 2017, Issued in U.S. Appl. No. 15/180,341.

(Continued)

*Primary Examiner* — Amr A Awad
*Assistant Examiner* — Aaron Midkiff
(74) *Attorney, Agent, or Firm* — Kaplan Breyer Schwarz, LLP (57) ABSTRACT

A multi-view display system that detects and locates viewers, establishes a set of characteristics for the viewers, generates or selects personalized content for each viewer based on the characteristics, and displays the personalized content, via at least one multi-view display, to the plurality of viewers simultaneously is disclosed.

10 Claims, 7 Drawing Sheets

(56) References Cited

U.S. PATENT DOCUMENTS

| | | | |
|---|---|---|---|
| 7,990,498 B2 | 8/2011 | Hong | |
| 8,461,995 B1 | 6/2013 | Thornton | |
| 9,080,219 B2 | 7/2015 | Chang et al. | |
| 9,080,279 B2 | 7/2015 | Jun et al. | |
| 9,715,827 B2 | 7/2017 | Ng et al. | |
| 9,743,500 B2 | 8/2017 | Dietz et al. | |
| 9,792,712 B2 | 10/2017 | Ng et al. | |
| 2003/0115096 A1 | 6/2003 | Reynolds et al. | |
| 2003/0156260 A1 | 8/2003 | Putilin et al. | |
| 2005/0195330 A1* | 9/2005 | Zacks | H04N 7/147 348/564 |
| 2007/0040892 A1 | 2/2007 | Aoki et al. | |
| 2009/0273486 A1 | 11/2009 | Sitbon | |
| 2010/0085517 A1 | 4/2010 | Hong | |
| 2010/0207961 A1 | 8/2010 | Zomet | |
| 2010/0214537 A1 | 8/2010 | Thomas | |
| 2011/0159929 A1 | 6/2011 | Karaoguz et al. | |
| 2011/0216171 A1 | 9/2011 | Barre et al. | |
| 2011/0242298 A1 | 10/2011 | Bathiche et al. | |
| 2011/0304613 A1 | 12/2011 | Thoresson | |
| 2012/0026157 A1 | 2/2012 | Unkel et al. | |
| 2012/0062565 A1 | 3/2012 | Fuchs et al. | |
| 2012/0105445 A1 | 5/2012 | Sakai et al. | |
| 2012/0140048 A1 | 6/2012 | Levine | |
| 2012/0218253 A1 | 8/2012 | Clavin | |
| 2013/0093752 A1 | 4/2013 | Yuan | |
| 2013/0114019 A1 | 5/2013 | Ijzerman et al. | |
| 2013/0169765 A1 | 7/2013 | Park et al. | |
| 2013/0321599 A1 | 12/2013 | Harrold et al. | |
| 2014/0015829 A1 | 1/2014 | Park et al. | |
| 2014/0035877 A1 | 2/2014 | Cai et al. | |
| 2014/0111101 A1 | 4/2014 | McRae | |
| 2015/0020135 A1 | 1/2015 | Frusina et al. | |
| 2015/0042771 A1* | 2/2015 | Jensen | G06F 3/01 348/54 |
| 2015/0049176 A1 | 2/2015 | Hinnen et al. | |
| 2015/0062314 A1 | 3/2015 | Itoh | |
| 2015/0085091 A1 | 3/2015 | Varekamp | |
| 2015/0092026 A1 | 4/2015 | Baik et al. | |
| 2015/0154394 A1 | 6/2015 | Kapinos et al. | |
| 2015/0198940 A1 | 7/2015 | Hwang et al. | |
| 2015/0279321 A1 | 10/2015 | Falconer et al. | |
| 2015/0334807 A1 | 11/2015 | Gordin et al. | |
| 2015/0365422 A1 | 12/2015 | Peterson et al. | |
| 2016/0012726 A1 | 1/2016 | Wang | |
| 2016/0210100 A1 | 7/2016 | Ng et al. | |
| 2016/0212417 A1 | 7/2016 | Ng et al. | |
| 2016/0224122 A1 | 8/2016 | Dietz et al. | |
| 2016/0227200 A1 | 8/2016 | Reitterer et al. | |
| 2016/0227201 A1 | 8/2016 | Ng et al. | |
| 2016/0261837 A1 | 9/2016 | Thompson et al. | |
| 2016/0261856 A1 | 9/2016 | Ng et al. | |
| 2016/0293003 A1 | 10/2016 | Ng et al. | |
| 2016/0341375 A1 | 11/2016 | Baker | |
| 2016/0341377 A1 | 11/2016 | Eddins | |
| 2016/0366749 A1 | 12/2016 | Dietz et al. | |
| 2016/0371866 A1 | 12/2016 | Ng et al. | |
| 2017/0205889 A1 | 7/2017 | Ng et al. | |

OTHER PUBLICATIONS

Authorized Officer: Jacinta Molloy, "International Search Report and Written Opinion" dated Sep. 29, 2016 issued in PCT Application No. PCT/US2016/037185.

"Office Action" dated Oct. 6, 2016 issued in U.S. Appl. No. 15/060,527.

Officer: Patricia Stein, "International Search Report and Written Opinion", dated Jun. 3, 2016, issued in related PCT Application: PCT/US2016/04122.

"Notice of Allowance and Fees Due", U.S. Appl. No. 15/180,341, dated Jul. 11, 2017, 7 pp.

"Non-Final Office Action", U.S. Appl. 15/060,527, dated May 19, 2017, 13 pp.

Authorized Officer: Mehrdad Dastouri, "International Preliminary Report on Patentability" dated Feb. 3, 2017 issued in PCT International Application PCT/US16/14122, 21 pp.

"Non-Final Office Action", dated Mar. 22, 2017, Issued in related U.S. Appl. No. 15/002,164, 28 pp.

Officer: Jeffrey Harold, "International Preliminary Report on Patentability", Completed Mar. 20, 2017, Issued in International Patent Application PCT/US2016/020784, 6 pp.

"Non-Final Office Action" dated Feb. 8, 2018 in U.S. Appl. No. 15/060,527.

"Non-Final Office Action" in U.S. Appl. No. 15/062,103 dated Feb. 14, 2018.

"Notice of Allowance", Issued in U.S. Appl. No. 15/184,874, dated Sep. 8, 2017, 14 pp.

"Final Office Action", U.S. Appl. No. 15/002,164, dated Oct. 5, 2017, 27 pp.

"Final Office Action", U.S. Appl. No. 15/002,175, dated Nov. 2, 2017, 21 pp.

"Non-Final Office Action", U.S. Appl. No. 15/002,014, dated Oct. 27, 2017, 11 pp.

"Final Office Action", U.S. Appl. No. 15/015,099, dated Nov. 13, 2017, 14 pp.

"Advisory Action" received for U.S. Appl. No. 15/002,175, dated Jun. 21, 2018, 3 pages.

Officer: Patricia Stein, "International Search Report and Written Opinion", dated May 12, 2016, issued in related PCT Application: PCT/US2016/020784.

"Non-Final Office Action", U.S. Appl. No. 15/060,527, dated May 19, 2017, 13 pp.

"Non-Final Office Action", Related U.S. Appl. No. 15/184,874, dated May 22, 2017, 19 pp.

"Non-Final Office Action", Related U.S. Appl. No. 15/015,099, dated May 4, 2017, 9 pp.

"Non-Final Office Action", dated Mar. 24, 2017, Issued in related U.S. Appl. No. 15/002,175, 26 pp.

"Non-Final Office Action", dated Jan. 26, 2017, issued in U.S. Appl. No. 15/088,912.

Non-Final Office Action received for U.S. Appl. No. 15/062,103 dated Oct. 11, 2018, 9 pages.

Non-Final Office Action received for U.S. Appl. No. 15/015,099 dated Oct. 12, 2018, 6 pages.

Final Office Action received for U.S. Appl. No. 15/060,527 dated Oct. 5, 2018, 14 pages.

Office Action received for European Application No. 16707570.4, dated Sep 13, 2018, 6 pages.

Notice of Allowance and Fees Due (PTOL-85) received for U.S. Appl. No. 15/060,527, dated Mar. 14, 2019, 8 pages.

Notice of Allowance and Fees Due (PTOL-85) received for U.S. Appl. No. 15/015,099, dated Dec. 18, 2018, 5 pages.

Non-Final Rejection received for U.S. Appl. No. 15/002,014, dated Jan. 15, 2019, 18 pages.

Final Rejection received for U.S. Appl. No. 15/944,366, dated Nov. 14, 2018, 26 pages.

"Non Final Office Action" dated Apr. 4, 2018 in U.S. Appl. No. 15/002,158, pp. 23.

Examiner initiated interview summary (PTOL-413B) received for U.S. Appl. No. 15/060,527, dated Jan. 30, 2019, 2 pages.

Advisory Action (PTOL-303) received for U.S. Appl. No. 15/944,366, dated Feb. 20, 2019, 3 pages.

Advisory Action (PTOL-303) received for U.S. Appl. No. 15/060,527, dated Jan. 30, 2019, 3 pages.

* cited by examiner

DIFFERENTIATED CONTENT DELIVERY SYSTEM AND METHOD THEREFOR

STATEMENT OF RELATED CASES

This case claims priority of U.S. Patent Application Ser. 62/105,706 filed Jan. 20, 2015 and is incorporated herein by reference. This case is also related to the following U.S. patent applications, all of which were filed on even date herewith and all of which are incorporated by reference. To the extent there are any inconsistencies between the language used in this disclosure and the language used in Ser. 62/105,706 or the cases listed below, the language used in this disclosure controls:
"Method for Calibrating a Multi-view Display";
"Individually Interactive Multi-View Display System and Methods Therefor"; and
"Individually Interactive Multi-View Display System For Non-Stationary Viewing Locations and Methods Therefor".

FIELD OF THE INVENTION

This disclosure pertains to multi-view displays and the use thereof.

BACKGROUND OF THE INVENTION

With the rapid and widespread adoption of internet-connected mobile devices, users have the ability to access personalized content in public spaces. Many services leverage these devices to provide users personalized experiences in shared environments. For example, map applications privately give users directions to desired destinations, targeted mobile advertisements are served to users based on their current location or behavior, and airline applications provide information on a specific users' flight status and gate assignment.

A drawback to providing these services via a mobile device is that it restricts an individual's experience to a small hand-held screen. When using these devices, people tend to look down at the screen rather than looking up and experiencing the world around them. Such behavior is isolating, not to mention potentially risky. Regarding the latter point, the experience of using a mobile device is somewhat cumbersome. To find information using a mobile device, a user typically retrieves the device from a pocket or purse, logs into the phone, opens an application, navigates menus, and then finds the information of interest. In addition to monopolizing one's visual attention, the ensuing interactions can be relatively cognitively demanding. For these reasons, using a mobile device is strongly discouraged in situations such as operating a vehicle or walking through a busy intersection. Indeed, mobile device use has become a significant contributing factor in pedestrian-motorist, pedestrian-cyclist, and in pedestrian-pedestrian collisions.

SUMMARY OF THE INVENTION

The present invention provides a way to deliver "personalized" or "differentiated" content to viewers that avoids the drawbacks of the prior art.

A differentiated content delivery system for practicing embodiments of the invention includes a viewer detection/location system, a viewer characterization system, a content-generation system, and a content presentation system.

The content presentation system enables personalized content to be simultaneously displayed to a plurality of viewers. In the illustrative embodiment, the content presentation system is embodied as one or more multi-view displays (MVDs). An MVD operates by controlling the images presented to different viewing locations, each of which locations have a unique viewing angle with respect to each pixel in the MVD. As a consequence, MVDs are capable of simultaneously presenting a different image to each one of plural viewers that are at different viewing locations with respect to the MVD.

In operation, the differentiated content delivery system detects viewers and determines their individual locations, establishes a set of characteristics for each viewer, generates potentially unique content for each viewer, and displays the characteristic-specific (differentiated) content to the associated viewers simultaneously on an individual basis, on the one or more MVDs. In accordance with the present teachings, the content that is generated to each one of plural viewers is inferred from the characterization of each such viewer. As a result, the content delivered to each viewer is typically unique and different from content that is delivered to at least some other of the viewers.

The detection system detects and, in some embodiments, locates viewers in the detection/viewing space. The detection system comprises, without limitation, sensors, such as image sensors (e.g., cameras, etc.) and/or RF location/tracking systems and/or beacons, and/or pressure sensors, in conjunction with appropriate software.

The characterization system determines/obtains/infers characteristics of each individual viewer in the detection/viewing space. The characterization of each individual can be based, for example and without limitation, on:
  observable characteristics, such as demographics;
  behavior, such as current or previous history of location, movement, speed, direction;
  inferred identification, such as via face recognition, group association, or the use of an identification, credit card, debit card, or other card or identifier;
  self-reported identification, such as kiosk entry, smartphone application login, membership in loyalty programs.

The characterization system comprises, in some embodiments and without limitation, cameras, and/or beacons, and/or RFID tags and interrogators, and/or kiosks, as well as appropriate software.

The content-generation system determines appropriate content to display to each viewer in the viewing space based on all or a subset of each viewer's characteristics. In some embodiments, content is pre-generated and loaded from a database. In some other embodiments, the content is generated in real-time based on the characterization data via software running, for example, on the MVD system's controller or another computer. In some embodiments, a server selects, from a media database, the image or video to display to a viewer based on their demographics or inferred preferences.

DETAILED DESCRIPTION

The terms appearing below and inflected forms thereof are defined for use in this disclosure and the appended claims as follows:

"acquire" or "capture" refer, in the context of a viewer, to the process of obtaining digital images or video from a sensing system, which typically (but not necessarily) includes a vision sensor, such as a camera.

"associating," when used in the context of a relationship between characteristics or content and a particular viewer, means that the characteristics or content pertain to the particular viewer.

"content" means whatever is delivered to a viewer via the MVD.

"detection space" means a region in which elements (such as the sensing system) of a differentiated content delivery system can detect (and, in some embodiments, locate) a viewer. With respect to the "viewing space" (see definition below), the detection space can be same, a subset, a superset, or a mix of both a subset and superset.

"differentiated content" or "personalized content," means content that is based on a set of characteristics for a viewer.

"multi-view display" or "MVD" means a display that is capable of simultaneously presenting a different image to each one of plural viewers that are at different viewing angles (locations) with respect to the MVD. The different images seen by each of such different viewers is displayed in the same location of the display.

"viewing space" means a region in which a viewer can view content presented by the MVD.

Additional definitions appear throughout the disclosure in context.

Figure 1:
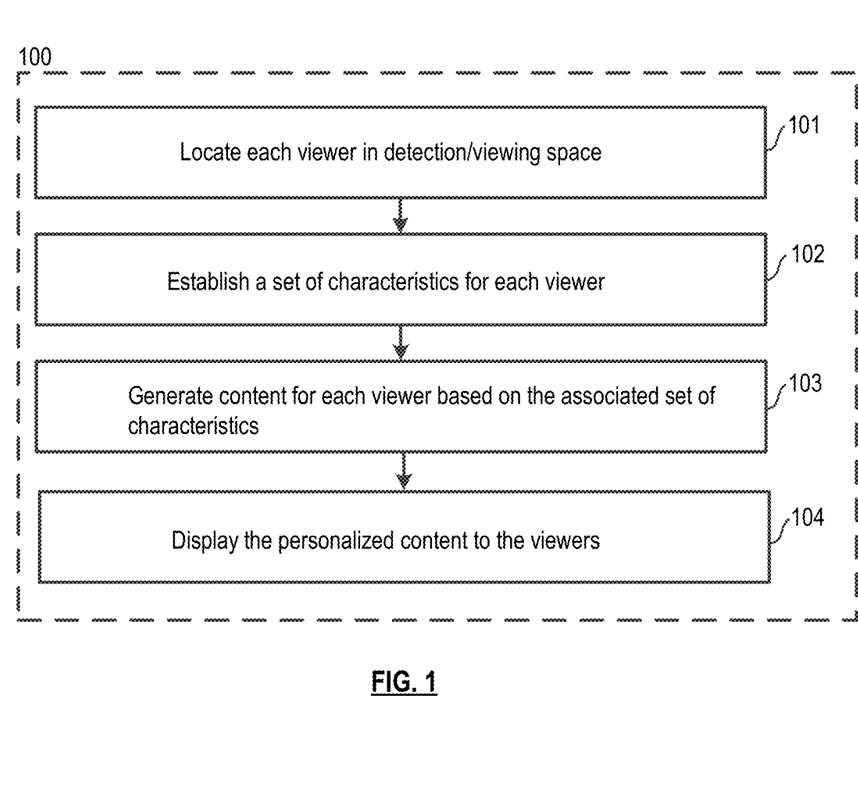
FIG. 1 depicts a method in accordance with the illustrative embodiment of the present invention.

FIG. 1 depicts method 100 for delivering differentiated content to a plurality of viewers. Method 100 includes the tasks of:

locating each viewer in a detection/viewing space (task 101);

establishing a set of characteristics for each viewer (task 102);

generating content for each viewer based on the associated set of characteristics (i.e., differentiated or personalized content) (task 103); and displaying, via an MVD, the differentiated content to each associated viewer (task 104).

Figure 2:
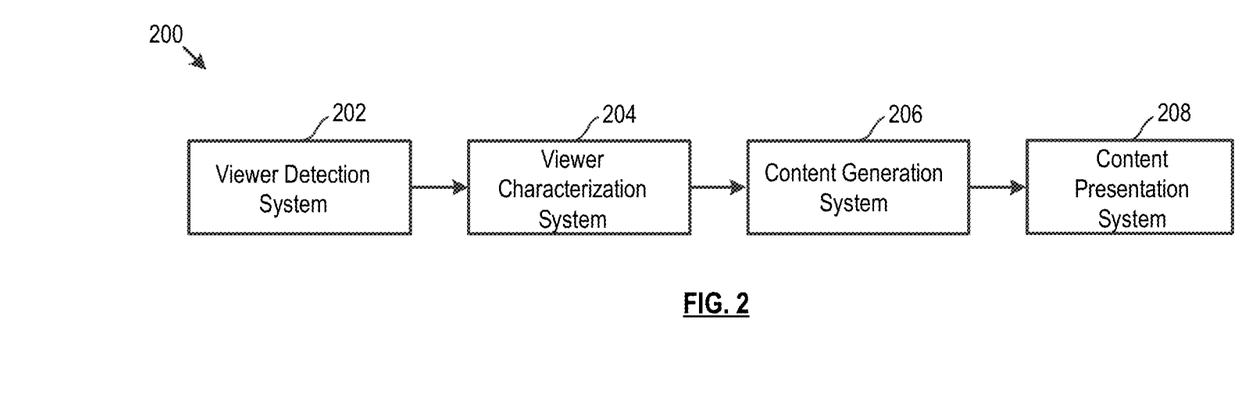
FIG. 2 depicts a block diagram of a differentiated content delivery system in accordance with the illustrative embodiment of the present invention

FIG. 2 depicts differentiated content delivery system 200 for practicing method 200. The system includes: viewer detection/location system 202, characterization system 204, content-generation system 206, and content presentation system 208 for simultaneously, and via the same display, displaying differentiated content to a plurality of viewers.

Figure 3:
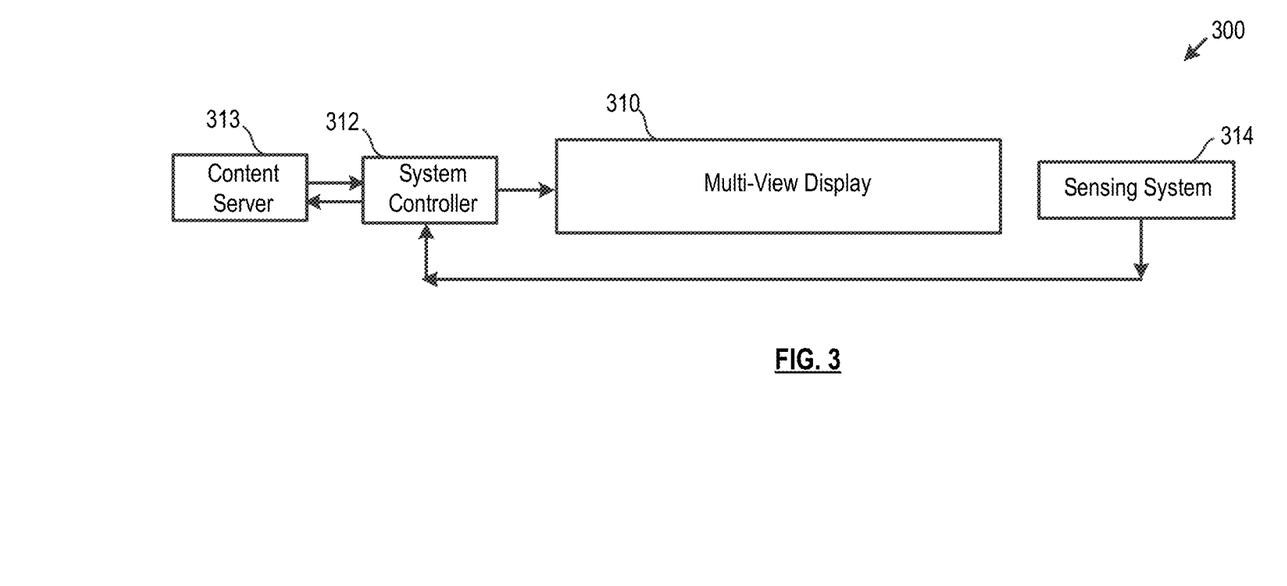
FIG. 3 depicts MVD system 300, which is an embodiment of the differentiated content delivery system of FIG. 2.

FIG. 3 depicts MVD system 300, which is an embodiment of differentiated content delivery system 200. MVD system 300 includes one or more multi-view displays (MVDs) 310, system controller 312, one or more sensing systems 314, and content server 313.

Referring now to FIGS. 1, 2, 3, differentiated content delivery system 200, and the illustrative embodiment of it—MVD system 300—provide the following functionalities, among any others: viewer detection/location, viewer characterization, personalized/differentiated content generation, and presentation of the differentiated content to the appropriate viewer. These functionalities are discussed in further detail below.

Viewer Detection System.

Viewer detection system 202 identifies the locations of (potential) viewers in a detection space. This is task 101 of method 100. The detection space is the region in which viewer detection system 202 can detect/locate viewers. Location determination is required because for presentation system 208 to simultaneously, and via the same display, display differentiated content to a plurality of viewers, the viewers must be at different viewing locations with respect to the display. To ensure that each viewer sees the appropriate personalized/differentiated content, the system must know where each viewer is with respect to the display.

In accordance with the illustrative embodiment, viewer detection system 202 is embodied as sensing system(s) 314. In the illustrative embodiment, sensing system 314 is a machine/computer vision system that captures images or videos of the scene in the detection space. As indicated above, the captured images/videos are used to determine the location of each viewer within the detection space.

Figures 4, 5:
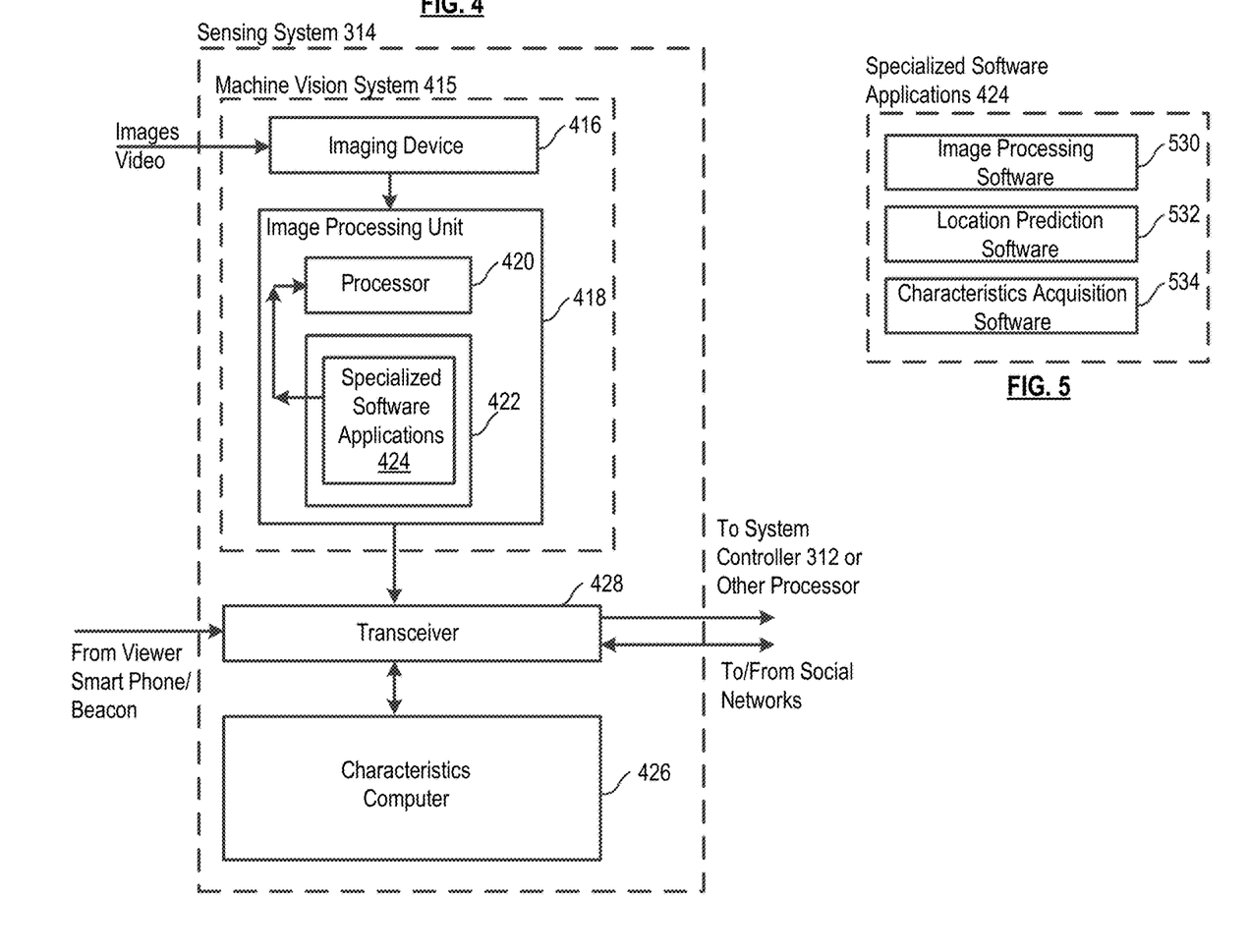
FIG. 4 depicts an embodiment of a sensing system for use in conjunction with MVD system 300.
FIG. 5 depicts specialized software applications for use in conjunction with embodiments of the invention.

Referring now to FIG. 4, in the illustrative embodiment, salient elements of sensing system 314 include imaging device(s) 416 for image acquisition and image processing unit 418 for performing various digital image processing techniques for extracting the requisite information. Embodiments of sensing system 314 that include imaging device(s) 416 will be able to provide the location of the viewer with respect to MVD 310, in addition to providing presence detection (and, in some embodiments, viewer characterization). It will be appreciated that in such embodiments, in addition to or as an alternative to the imaging device, other devices/techniques can be used for locating a viewer (e.g., RF triangulation techniques, GPS, etc.).

Imaging device(s) 416 typically include one or more cameras as well as lenses and lighting that are designed, collectively, to provide the requisite differentiation that is required by subsequent processing. In some embodiments, the camera(s) is a depth-aware camera, such as structured light or time-of-flight cameras, which can generate a depth map of what is being seen through the camera at a short range, wherein this data is then used to approximate a 3D representation of what is being seen. In some other embodiments, the camera(s) is a stereo camera, wherein, using two cameras whose relations to one another are known, a 3D representation can be approximated by the output of the cameras. In some further embodiments, one or more standard 2D cameras are used for image acquisition. In some additional embodiments, the imaging device comprises a radar system. Those skilled in the art will know how to make and/or specify and use various cameras, radar, or other imaging devices for the purposes of presence detection/location determination.

Sensing system 314 can employ conventional (2D visible light) imaging, although other techniques, such as imaging various infrared bands, line scan imaging, 3D imaging of surfaces or other techniques may suitably be used. Those skilled in the art while know how to select and use an appropriate imaging technique in conjunction with embodiments of the invention.

In some embodiments, imaging device 416 is combined with image processing unit 418, which includes processor 420 running specialized software applications 424 (such as image processing software 530, see FIG. 5) stored in processor-accessible data storage 422. In some other embodiments, imaging device 416 is separate from the image processing unit, the latter of which is implemented on a separate computer (not depicted) or on system controller 312, running appropriate image processing software.

Any of a number of image processing techniques may suitably be used, including, without limitation, stitching/registration, morphological filtering, thresholding, pixel counting, image segmentation, face detection, edge detection, blob discovery and manipulation, to a name a few.

Figure 6:
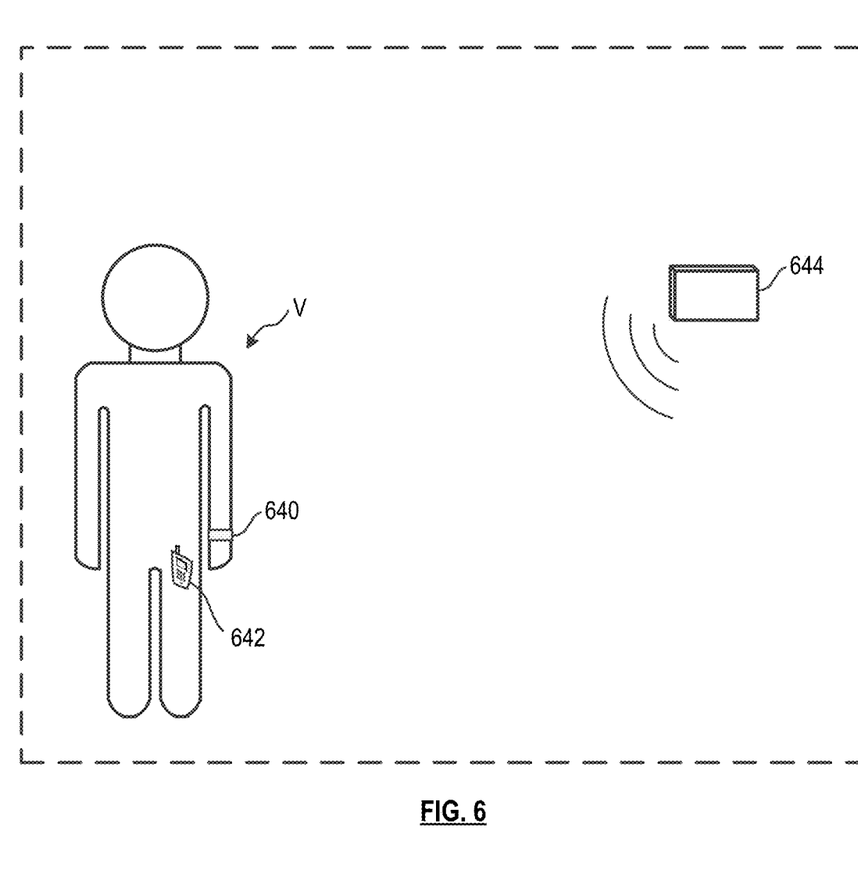
FIG. 6 depicts some elements of an alternative embodiment of a sensing system for use in conjunction with MVD system 300.

With reference to FIG. 6, in some embodiments, sensing system 314 further comprises passive trackable object 640, such as a badge, a wrist band, an arm band, eye glasses, or having some other suitable form factor (e.g., wearable, readily carried, etc.) for accompanying viewer V. Passive trackable object 640 facilitates viewer detection by rending the viewer more distinguishable from the surroundings than would otherwise be the case. In some embodiments, this is accomplished by imbuing passive trackable object 640 with certain surface characteristics (e.g., color, reflectivity, etc.) that render it readily trackable and distinguishable from other surfaces in the detection space.

In some further embodiments, sensing system 314 comprises active trackable object 642, which has a form factor that enables it to be readily carried or worn. Unlike the passive trackable object, active trackable object 642 can be detected by an EM interrogating device/system, such as beacon 644, or the active trackable object can otherwise wirelessly transmit information to one or more receivers. For example, in some embodiments, active trackable object 642 is a smart phone.

Thus, in some embodiments, sensing system 314 incorporates an EM interrogation device/system rather machine vision devices/systems. For example, in some embodiments, sensing system 314 includes beacon 644, which detects the presence and identity of viewers' mobile devices, such as smartphone 642 in the pocket of viewer V. In such embodiments, plural beacons are placed throughout the environment and communicate wirelessly to viewers' mobile devices in each beacon's vicinity. Communication protocols/methodologies include, without limitation, Bluetooth, Wi-Fi, or the like. In some embodiments, the mobile devices detect signals from the beacons and transmit information (e.g., beacon signal strength, etc.) to facilitate location determination. In some other embodiments, the beacons detect signals from the mobile devices and re-transmit them to one or more computers for processing to determine the identities and locations of mobile devices. Alternatively, a mobile-device indoor location system or GPS can be used to detect the location of the mobile device users in the viewing space. The active trackable object thus serves as a proxy for the viewer.

In yet another embodiment using an active trackable object, viewers carry RFID tags (e.g., incorporated in a badge, wrist band, arm band, etc.) and RFID readers are placed through the environment of interest. The RFID readers detect the identity and location of each viewer's RFID tag as a proxy for the location of each viewer. The RFID tags can be active, utilizing internal power sources to communicate with RFID readers, or the RFID tags c a n be passive, utilizing radio frequency from RFID readers to power the circuitry to communicate with the readers. For the purposes of the present disclosure and the appended claims, a passive RFID tag is considered an active trackable object.

It is notable that active trackable objects can be used with or without machine vision systems in sensing system 314.

In a dynamic environment, a viewer may be in continuous motion; however, sensing system 314 might update each viewer's detected location periodically, rather than continuously. Thus, at a particular point in time, a viewer might have moved since the last detection/location update. If the viewer moves beyond the previously detected location, the viewer might lose sight of the content being displayed to them (because viewing such content is location dependent). To address this issue, in some embodiments, sensing system 314 designates a personal viewing space around the viewer at which to display the viewer's differentiated content. This permits the viewer to move within the personal viewing space between location updates without losing sight of the differentiated content being displayed for their benefit. Furthermore, in some embodiments, sensing system 314 uses a model (e.g., location prediction software 532, see FIG. 5) to predict the future location of a viewer given the viewer's past and current behavior, and displays the differentiated content for viewing at that predicted location. In some additional embodiments, the system uses an RFID reader that interrogates a RFID tag carried by a viewer. The identifying information obtained from the RFID tag can be associated with a blob (via blob detection). As long as sensing system 314 continues to track the blob, the system can continue to deliver differentiated content to the viewer.

Viewer Characterization System.

Referring once again to FIGS. 1 through 3, viewer characterization system 204 establishes a set of characteristics for each viewer. This is task 102 of method 100.

The set of characteristics established for each viewer is the basis for the content that is generated for each such viewer. In some embodiments, viewer characterization is performed, at least in part, using sensing system 314 and/or characteristics computer 426.

Viewer characteristics may be determined or estimated through "inferred identity" or "observable traits." With respect to inferred identity, in some embodiments, a database of characteristics of viewers may be pre-populated, such as obtained from social media (e.g., Facebook, etc.), and tagged by a viewer's identity. Identity includes, but is not limited to, name, identification number or character sequence, phone number, and/or profile. In some embodiments, the system infers the identity of the viewer in the detection space and determines/estimates the viewer's characteristics from the pre-populated database. In some embodiments, a smartphone beacon communicates with a viewer's smartphone that runs a social network application. The beacon receives the social network profile identity of the user. In some embodiments, the beacon sends the profile identity to characteristics computer 426 that communicates with the social network database to determine or estimate the user's characteristics. In some other embodiments, a shopper scans his credit/debit card or loyalty rewards card via an appropriate interface at a kiosk that is part of MVD system 300. The card ID number is read and communicated to a computer that contains a database of loyalty member shopping histories and preferences. That information is then transmitted to characteristics computer 426. In some further embodiments, a traveler's boarding pass is scanned so that the system can obtain flight information.

Without resolving to identity, characteristics may include observable traits. Observable traits include, without limitation, demographics, visible traits, behavior, location, and/or device usage. For example, in some embodiments, image processing software 530 running on processor 420 of image processing unit 418 includes facial recognition software, which is used to analyze a viewer's face and estimate certain viewer characteristics therefrom (e.g., age, gender, etc.). In another embodiment, a shopper's recent store visits are recorded and current direction of movement is established via sensing system 314. In some other embodiments, a video feed of shoppers' movements are captured; processor 420 processes the video to estimate the shopper's walking path and direction. In another embodiment, a smartphone beacon communicates wirelessly with a smartphone to determine the brand and model of the smartphone used by a viewer. All of these observable traits can form at least part of the set of characteristics of a particular viewer.

In some embodiments, a hybrid approach is used wherein sensing system 314 determines/estimates a set of characteristics of a viewer, using characteristics acquisition software 534, upon introduction of the viewer (e.g., by swiping a rewards card at a kiosk, etc.) and assigns a temporary identity to the viewer. This temporary identity will, in some scenarios, be sufficient to affect the content displayed to the viewer and might not be directly affiliated with the viewer's actual identity. Subsequent characterizations of the viewer involve determining the temporary identity of the viewer.

As noted parenthetically above, in some embodiments, a shopper, for example, is introduced to the system by swiping the shopper's loyalty reward card at a kiosk. The kiosk reads the loyalty card number and communicates with a computer that contains a database of loyalty member profiles, histories, and/or preferences. The characteristics of the shopper may be determined or estimated through the shopper's loyalty reward profile.

In some embodiments, the characterization performed by the system estimates the shopper's physical appearance (e.g., hair color, height, clothes color, etc.).

As previously indicated, in some embodiments, sensing system 314 captures a video feed of the viewer (e.g., shopper, etc.), wherein the video feed is processed using appropriate image processing techniques (e.g., face recognition, color heuristics, etc.) to estimate the shopper's characteristics. Characteristics computer 426 assigns a temporary identity, associated with the characteristics, to the viewer. As the shopper moves throughout the viewing space, cameras that are part of sensing system 314 capture video feeds and send them to the processor to determine/estimate the user's physical appearance, inferring the temporary identity previously assigned to the viewer, thereby accessing the shopper's loyalty reward profile characteristics.

In some embodiments, viewer history or context a id in the characterization of viewers. For example, consider the following scenario: a first visitor walks through a particular room in a hospital and the differentiated content delivery system determines/estimates the visitor's temporary identity. The system then uses this information to aid in the characterization of visitors in remote areas of the building for a period of time. More particularly, it is very unlikely for the first visitor to be able to travel to other remote locations of the hospital in a brief period of time. As such, the system will be biased to not characterize visitors in remote locations as the first visitor.

In some embodiments, characterization of a viewer is updated over time. For example, when a viewer is first introduced into the differentiated content delivery system, an initial set of characteristics for the viewer are determined/estimated via sensing system 314. This initial set of characteristics might be limited to only those that can be determined/estimated at the time of introduction. Over time, more characteristics of the viewer are determined/estimated and previous characteristics might, as a result, be modified. These changes ca n be due, for example, to a change in environmental conditions (e.g., lighting, proximity to sensors, etc.) enabling more characteristics to be determined/estimated. These changes might also be due to actions performed by the viewer (e.g., changing appearance, changing movement behavior, etc.) or due to interactions with the environment (e.g., swiping a credit card).

Characteristics of a viewer can include, without limitation, individual, group, and environment-related characteristics. Individual characteristics are intrinsic to each individual viewer (e.g., appearance, behavior, and/or preferences). Group characteristics, on the other hand, ca n be determined or estimated from the viewer's interactions and relationships with other viewers. For example, groups of movie-goers might be standing in the lobby of a movie theater, within sight of a multi-view movie advertisement sign. Within a group, not all members might have yet received their movie tickets. However, since it is likely that all members of a group will attend the same movie, the desired movie ca n be inferred as a group characteristic for each member of the group and used to select the advertisement shown on the multi-view sign.

Environment-related characteristics are determined/estimated from the viewer's relationship with the environment. For example, a group of travelers at an airport are crowded around a number of security gates, with a multi-view directional sign that indicates the gate through which each traveler should pass. The proximity and orientation of a traveler to a particular security gate is, in this example, an environment-related characteristic used to determine the direction that the multi-view sign directs the traveler.

Content Generation System.

Having established a set of characteristics for each viewer (task 102), differentiated content is generated for each viewer based on the associated set of characteristics by content generation system 206 (task 103). With respect to MVD system 300, content generation system 206 is embodied as content server 313. In some embodiments, some of the tasks involved in content generation/selection are performed via sensing system 314.

Figure 8:
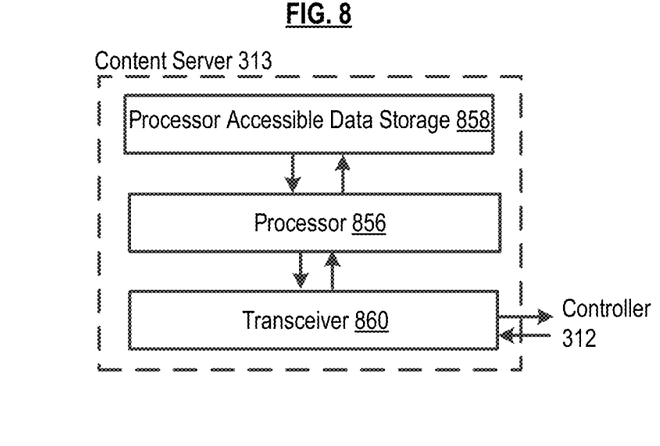
FIG. 8 depicts an embodiment of a content server for use in conjunction with MVD system 300.

Content server 313, which is depicted in further detail in FIG. 8 includes processor 856, processor-accessible storage 858, and transceiver 860.

Processor 856 is a general-purpose processor that is capable of, among other tasks, executing an operating system and executing specialized application software used in conjunction with the embodiments of the invention. Processor 856 is also capable of populating, updating, using, and managing data in processor-accessible data storage 858. In some alternative embodiments of the present invention, processor 856 is a special-purpose processor. It will be clear to those skilled in the art how to make and use processor 856.

Processor-accessible data storage 858 is non-volatile, non-transitory memory technology (e.g., ROM, EPROM, EEPROM, hard drive(s), flash drive(s) or other solid state memory technology, CD-ROM, DVD, etc.) that store, among any other information, data (such as pre-generated content) and specialized application software, which, when executed, enable processor 856 to generate/select content in accordance with task 103 of method 100. It will be clear to those skilled in the art how to make and use processor-accessible data storage 858.

Transceiver 860 enables communications with, for example and without limitation, system controller 312, and the Internet, such as to access social media sites, etc., via any appropriate medium, including wireline and/or wireless, and via any appropriate protocol (e.g., Bluetooth, Wi-Fi, cellular, optical, ultrasound, etc.). The term "transceiver" is meant to include any communications means and, as appropriate, various supporting equipment, such as communications ports, antennas, etc. It will be clear to those skilled in the art, after reading this specification, how to make and use transceiver 860.

Although the illustrative embodiment depicts a single content server 313, in some embodiments, the system includes multiple content servers. Furthermore, in some embodiments, the functionality of content server 313 is distributed among other elements of the MVD system 300, such as system controller 312.

Content generation includes selecting from (i) pre-generated content or (ii) generating the content in real time.

Figure 9:
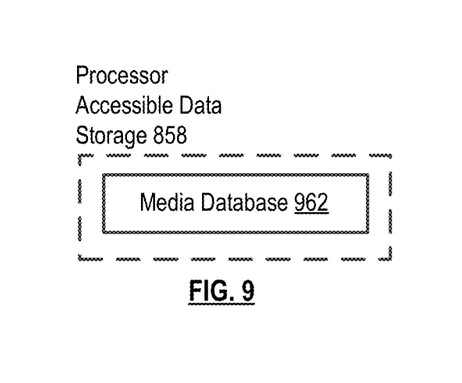
FIG. 9 depicts contents of processor accessible data storage of the content server of FIG. 8.

With respect to using pre-generated content, consider a group of shoppers walking through a shopping mall in front of multi-view displays, wherein the differentiated content delivery system selects media from media database 962 to display to each shopper. The system captures images or video feeds of the shoppers and transmits them to characteristics computer 426 for estimating shoppers' characteristics, such as age, race, gender, hair color, etc. Furthermore, the system performs a statistical analysis on the shoppers' demographics and chooses, during the content generation task, an advertisement image from media database 962 (FIG. 9) stored in processor-accessible data storage 858 in content server 315 to display to the individual shopper.

As an example of an embodiment wherein content is generated in real time, consider a scenario wherein MVDs located throughout an airline terminal provide personalized content (e.g., gate location, etc.) simultaneously to each of number of travelers. Within the terminal, some of the travelers swipe their boarding pass through a scanner (e.g., located at a kiosk, etc.) that is part of the differentiated content delivery system. The scanner reads the travelers' assigned gates from the boarding passes. To display personalized gate information, etc., to each such traveler as they move through the terminal, the system must be able to recognize each traveler, associate the scanned boarding pass with each of the travelers, and routinely update their location as they move through the terminal.

To associate the boarding pass with a traveler, imaging device 416, which is part of sensing system 314, captures an image or video feed of each traveler as they scan their boarding pass. The image/video is processed via image processing unit 418 to estimate the traveler's physical characteristics, clothing color, etc. In some embodiments, a processor within the system (e.g., system controller 312 or other processor, etc.) assigns a temporary ID (e.g., a string of numbers, etc.) to the traveler's estimated physical characteristics. As each traveler nears one of MVDs 310, sensing system 314 locates and identifies them. Since the boarding pass information is associated with each such traveler (to the extent that the information has been scanned, etc.), the system knows where each such traveler is ultimately headed. The content server 313 therefore generates an image, such as the passenger's name, a gate number, and an arrow that points each traveler to their departure gate. At least a portion of that image—the direction in which the arrow points—is a function of each traveler's location in the terminal at the time the image is displayed.

In another embodiment, wherein sensing system 314 utilizes blob detection for image processing, the sensing system tags a blob with travel information when a boarding pass is swiped. The blob is then tracked through the detection space of sensing system 314. As long as any given blob remains within the detection space, there is no need to acquire physical characteristics of the viewer.

Content Presentation System.

Having generated the personalized/differentiated content based on a set of characteristics for each of a plurality of viewers, what remains is for the personalized content to be simultaneously displayed to each viewer via content presentation system 208. In accordance with the present teachings, content presentation system 208 is embodied as a multi-view display, such as MVD 310, and a system controller, such as controller 312.

A multi-view display is capable of displaying different images to different viewers based on a difference in viewing location. The principle of operation of an MVD is known to those skilled in the art and so will be discussed only briefly. The salient difference between a traditional display, such as LCD, LED, plasma, or projection display and a multi-view display is that the former displays the same image to all viewers while the latter is able to display different images to different viewers simultaneously.

Some versions of a multi-view display include one or more projection elements that emit light of different color and brightness at different angles. The projection element includes a light source, an imager, and a lens. Examples of suitable imagers include, without limitation, digital micromirror devices, liquid crystals, light emitting diodes, and/or liquid crystal on silicon (LCOS). Each projection element can be considered to be a single pixel of the display, wherein a full graphic multi-view display is formed from an array of such projection elements. In some embodiments, each projection element—each pixel—is controlled by its own processor. In some other embodiments, a processor controls plural projection elements, but less than all of the elements of the display. In some embodiments, all of such processors in the display are connected via a network (e.g., Ethernet, Infiniband, $I^2C$, SPI, Wi-Fi, etc.), or, more generally, a communication channel (e.g., HDMI, etc.).

The light source illuminates the imager and the imager filters or directs the light through the lens. The lens is capable of directing light that is received from different locations of the imager in different directions. For example, a projector with resolution of 1920×1080 is capable of controllably directing light in over two million directions. The color and brightness emitted at each angle is different. Each element, from a viewer's perspective, appears to be a light source of the color and brightness of the light that is projected onto the viewer, even if the projection is too dim for any image to be visible on nearby surfaces. As a consequence, the appearance of each projection element from the perspective of a viewer is dependent upon the angle at which the viewer views the element.

Figure 7:
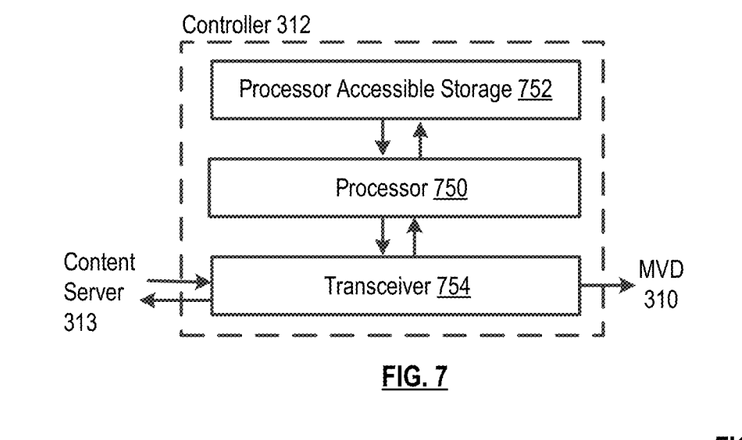
FIG. 7 depicts an embodiment of a system controller for use in conjunction with MVD system 300.

The operation of the MVD is managed via system controller, such as system controller 312, which is depicted in further detail in FIG. 7. The system controller directs the operation of the multi-view display. For example, in some embodiments, system controller 312 will fetch content from content server 313 and then direct the operation of the MVD, causing the MVD to display a specific image to a specific location in the viewing space. The operation of system controller 312 is discussed in further detail in U.S. patent application Ser. No. 15/002,014 entitled "Method for Calibrating a Multi-view Display".

As depicted in FIG. 7, system controller 312 includes processor 750, processor-accessible storage 752, and transceiver 754.

Processor 750 is a general-purpose processor that is capable of, among other tasks, executing an operating system, executing device drivers, and executing specialized application software used in conjunction with the embodiments of the invention. Processor 750 is also capable of populating, updating, using, and managing data in processor-accessible data storage 752. In some alternative embodiments of the present invention, processor 750 is a special-purpose processor. It will be clear to those skilled in the art how to make and use processor 750.

Processor-accessible data storage 752 is non-volatile, non-transitory memory technology (e.g., ROM, EPROM, EEPROM, hard drive(s), flash drive(s) or other solid state memory technology, CD-ROM, DVD, etc.) that store, among any other information, data, device drivers (e.g., for controlling MVD 310, etc.), and specialized application software, which, when executed, enable processor 750 to direct MVD 310 to present differentiated content for viewing by viewers at a plurality of locations. It will be clear to those skilled in the art how to make and use processor-accessible data storage 752.

Transceiver 754 enables communications with content server 313 and other devices and systems via any appropriate medium, including wireline and/or wireless, and via any appropriate protocol (e.g., Bluetooth, Wi-Fi, cellular, optical, ultrasound, etc.). The term "transceiver" is meant to include any communications means and, as appropriate, various supporting equipment, such as communications ports, antennas, etc. It will be clear to those skilled in the art, after reading this specification, how to make and use transceiver 754.

Although the illustrative embodiment depicts a single controller 312, in some embodiments, the functionality of controller 312 is distributed among several devices that might or might not properly be characterized as controllers.

As will be appreciated by those skilled in the art, the foregoing provides a description of one of a variety of different implementations of a multi-view display. Any implementation of an MVD known to those skilled may suitably be used. Furthermore, embodiments of an MVD as disclosed in U.S. patent application Ser. No. 15/002,014, entitled "Method for Calibrating a Multi-view Display" may suitably be used in conjunction with embodiments of the present invention.

Figure 10:
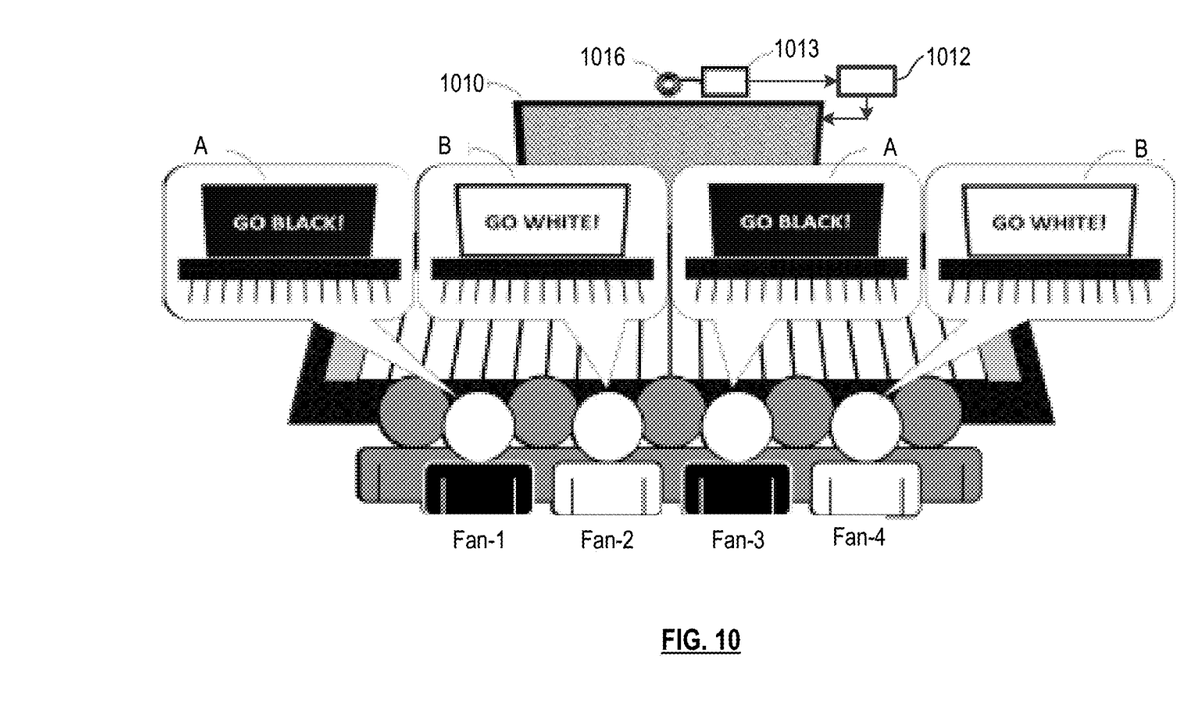
FIG. 10 depicts the differentiated content delivery system of FIG. 2 in use in a first environment.

FIG. 10 depicts a differentiated content delivery system for use in conjunction with a stationary viewing application; in particular, sports fans in a stadium. MVD 1010 displays personalized content to each individual in the audience according to team affiliation. With stationary viewers sitting in seats in a stadium, detection/location of individual viewers can be predetermined. That is, during the commissioning of the differentiated content delivery system, the location of each seat relative to MVD 1010 is determined (distance and angle) and stored in a database accessible to the system. To establish the set of characteristics for each viewer, imaging device 1016 captures an image or video feed of the fans, such as Fan-1, Fan-2, Fan-3, and Fan-4. Images/video is processed by image processing to extract the team affiliation of audience members. For example, in some instances, image processing uses pixel colors of an audience member's clothing to determine the team affiliation. Alternatively or in addition, image processing employs pattern recognition on a logo appearing on an audience member's outfit. In such fashion, the fans are characterized as a fan of the team wearing black uniforms or a fan of the team wearing white uniforms.

For example, Fan-1 and Fan-3 are characterized as fans of the black-uniform team and Fan-2 and Fan-4 are characterized as fans of the white-uniform team. Based on those characterizations, content server 1013 selects the content appropriate for each fan. In particular, content "A," which is the cheer "Go Black!", is selected for Fan-1 and Fan-3. Content "B," which is the cheer "Go White!", is selected for Fan-2 and Fan-4. Content server 1013 transmits the differentiated content to system controller 1012, which causes MVD 1010 to display the content for viewing by the appropriate fan. That is, fans Fan-1 and Fan-3 see messages, such as "Go Black!," tailored to fans of the black-shirt team and fans Fan-2 and Fan-4 see messages, such as "Go White!," tailored to fans of the white-shirt team, simultaneously and all on the same MVD.

Figure 11:
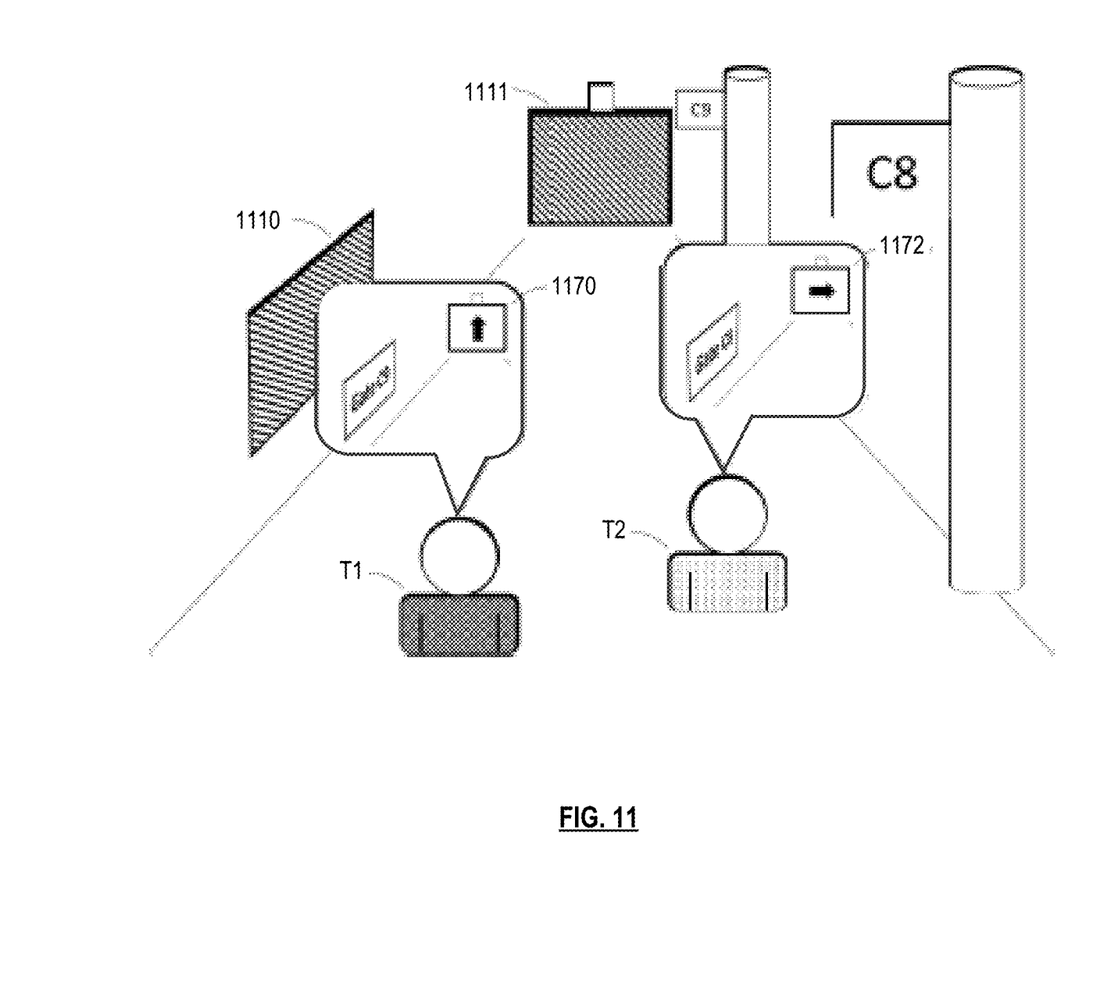
FIG. 11 depicts the differentiated content delivery system of FIG. 2 in use in a second environment.

FIG. 11 depicts a differentiated content delivery system in use in conjunction with a non-stationary viewing application; in particular, airline passengers moving through an airline terminal. Typically, airport signage displays flight information for all travelers, forcing travelers to prune out the unnecessary information to find that which pertains to them. In system FIG. 11, MVDs 1110 and 1111 that show each traveler messages based on the traveler's specific flight. Traveler T1, heading toward gate C9, is directed straight ahead via arrow 1170, while traveler T2, heading toward gate C8, is directed to go right via arrow 1172. For clarity, the sensing system is omitted from the figure. The sensing system acquires images of the environment and processes them. For example, in some embodiments, an imaging device generates a video feed, which is processed via blob detection and image segmentation to estimate the locations of travelers. In another embodiment, a Wi-Fi tracking system measures relative signal strengths of a traveler's smartphone and triangulates the smartphone's location within the environment.

The system also processes the images to infer an identity of each traveler and thus determine each traveler's destination. For example, a traveler may have previously scanned their boarding pass at a kiosk, which determined the traveler's gate assignment, while a camera system may have gathered heuristics (e.g., hair color, outfit color, and/or height, etc.) about the traveler. A camera system throughout the airport gathers heuristics of each traveler and compares them to the heuristics gathered when travelers scanned their boarding pass, thereby inferring the identity and/or gate assignment of each traveler walking through the airport. The computer then generates an appropriate directional message to display to each traveler and transmit all such messages to the multi-view displays. As each traveler moves throughout the airport, the direction in which each display directs the traveler's content is continuously updated so as to remain only visible from that traveler's perspective.

An airline terminal was presented as an exemplary environment for use of the differentiated content delivery system in which the users of the system are non-stationary. Other such environments include, for example and without limitation, other transportation facilities (e.g., train stations, bus stations, etc.), lodging facilities (e.g., motel, hotel, resort, etc.), educational venues (k-12 schools, universities, museums, etc.), government venues (e.g., military installations, courthouses, municipal buildings, etc.), entertainment venues (e.g., casinos, amusement parks, theme parks, theaters, stadiums, zoos, etc.), public facilities (e.g., parking lots, downtown areas, parks, cultural areas, historic areas, fairgrounds, tourist districts, etc.), business venues (e.g., business campuses, office buildings, warehouses, shopping malls, retail and dining establishments, etc.), and medical facilities (e.g., hospitals, medical buildings, etc.).

It is to be understood that the disclosure teaches just one example of the illustrative embodiment and that many variations of the invention can easily be devised by those skilled in the art after reading this disclosure and that the scope of the present invention is to be determined by the following claims.

What is claimed:

1. A method for providing differentiated content, via a multi-view display, to a plurality of viewers in a viewing space, the method comprising:
    determining a location of each of the viewers in the viewing space, wherein determining a location further comprises using a model to predict a future location of a viewer based on the viewer's behavior;
    establishing a set of characteristics for each of the viewers; and
    generating, via a content-generation system, differentiated content for presentation to each of the viewers via the multi-view display, wherein the differentiated content generated for an associated viewer is inferred by the content-generation system based on the set of characteristics established for the associated viewer.

2. The method of claim 1 further comprising displaying, via the multi-view display, the differentiated content to each associated viewer for viewing at their respective locations, wherein the differentiated content is viewable only at the associated viewer's location.

3. The method of claim 1 wherein determining a location further comprises using at least one camera to observe the viewing space.

4. The method of claim 1 wherein determining a location further comprises using beacons.

5. The method of claim 1 wherein establishing the set of characteristics further comprises establishing the set of characteristics via inferred identity.

6. The method of claim 5 wherein establishing the set of characteristics via inferred identity further comprises accessing a database containing characteristics for at least some of the viewers.

7. The method of claim 1 wherein establishing the set of characteristics further comprises establishing the set of characteristics via observable traits of a viewer.

8. The method of claim 7 wherein observable traits are selected from the group consisting of visible traits of the viewer, behavior of the viewer, location of the viewer, device usage of the viewer.

9. The method of claim 1 wherein the set of characteristics is updated.

10. The method of claim 1 wherein generating content further comprises selecting the content from pre-generated content, wherein the subject matter of the pre-generated content selected for a viewer is associated with the set of characteristics of the viewer, the method further comprising:
    displaying the differentiated content via the multi-view display to each of the viewers, wherein the multi-view display comprises one or more projection elements that emit light of a different color and brightness at different angles.

* * * * *